US008087621B2

(12) United States Patent
Sayilgan et al.

(10) Patent No.: US 8,087,621 B2
(45) Date of Patent: Jan. 3, 2012

(54) HOLDER FOR FIXING COMPONENTS, IN PARTICULAR LINES, INSIDE AN AIRCRAFT WITHOUT USING HOLES

(75) Inventors: Cihangir Sayilgan, Hamburg (DE); Holger Frauen, Hamburg (DE); Frank Neuhaus, Jork (DE); Robert Alexander Goehlich, Hamburg (DE); Rainer Schildt, Oederquart (DE)

(73) Assignee: Airbus Deutschland GmbH, Hamburg (DE)

( * ) Notice: Subject to any disclaimer, the term of this patent is extended or adjusted under 35 U.S.C. 154(b) by 162 days.

(21) Appl. No.: 12/273,075

(22) Filed: Nov. 18, 2008

(65) Prior Publication Data

US 2009/0159750 A1 Jun. 25, 2009

Related U.S. Application Data

(60) Provisional application No. 61/008,349, filed on Dec. 20, 2007.

(51) Int. Cl.
*F16L 3/08* (2006.01)

(52) U.S. Cl. ............................. 248/70; 248/56; 248/68.1

(58) Field of Classification Search ................... 248/56, 248/58, 65, 68.1, 70, 71, 73; 174/95, 97; 385/134; 439/215
See application file for complete search history.

(56) References Cited

U.S. PATENT DOCUMENTS

| | | | | |
|---|---|---|---|---|
| 3,909,505 A | * | 9/1975 | Taylor | 174/72 A |
| 5,797,573 A | | 8/1998 | Nasu | |
| RE38,311 E | * | 11/2003 | Wheeler | 385/135 |
| 6,870,103 B1 | * | 3/2005 | Wiant et al. | 174/68.2 |
| 7,433,205 B2 | * | 10/2008 | Fontana et al. | 361/825 |
| 2005/0082431 A1 | | 4/2005 | Scown et al. | |

FOREIGN PATENT DOCUMENTS

DE 4208493 A1 9/1993

OTHER PUBLICATIONS

German Office Action for DE 10 2007 061 425.1 dated Sep. 13, 2011.

* cited by examiner

*Primary Examiner* — Amy J Sterling
(74) *Attorney, Agent, or Firm* — Jenkins, Wilson, Taylor & Hunt, P.A.

(57) ABSTRACT

Disclosed is a holder for fixing all types of component, in particular lines, without using holes and largely without using tools inside a conventional fuselage structure of an aircraft with stringers and annular formers, the formers each being provided with an angle bracket at crossing points between a stringer and an annular former. The holder is configured so as to be split in two with a lower part and an upper part which can be connected thereto, the lower part being slidable onto an angle bracket. By attaching the upper part to the lower part, the holder is positionally fixed at the crossing point in the top region of an annular former. It is fixed in its final position by connecting the holder to a transverse line holder as a function element by means of an expansion pin or other connection elements. Other alternative function elements for fixing the components, such as a longitudinal line holder, a transverse batten or a longitudinal batten for specific installation requirements, may, if necessary, be combined with at least one holder so as to form holder arrangement with any desired degree of complexity.

17 Claims, 4 Drawing Sheets

HOLDER FOR FIXING COMPONENTS, IN PARTICULAR LINES, INSIDE AN AIRCRAFT WITHOUT USING HOLES

RELATED APPLICATIONS

The presently disclosed subject matter claims the benefit of U.S. Provisional Patent Application Ser. No. 61/008,349, filed Dec. 20, 2007; the disclosure of which is incorporated herein by reference in its entirety.

FIELD OF THE INVENTION

The invention relates to a holder for fixing components, in particular lines, without using holes inside a fuselage structure of an aircraft, the fuselage structure being braced with a plurality of longitudinal strut elements, in particular stringers and a plurality of transverse strut elements, in particular annular formers, an angle bracket being arranged at crossing points between a stringer and an annular former in each case.

The invention further relates to a holder arrangement for fixing components in the fuselage of aircraft using at least two holders according to the invention.

BACKGROUND OF THE INVENTION

Fuselages for aircraft are currently usually produced in sections by joining a plurality of ready-made fuselage portions to one another by forming transverse seams. Each substantially barrel-shaped fuselage portion comprises a plurality of annular formers arranged behind one another which are covered with a fuselage skin. A plurality of longitudinal strut elements, in particular stringers, are arranged on the inner face of the fuselage skin. The stringers are arranged so as to be spaced apart at equal distances over the periphery of the fuselage skin and extend parallel to one another. In order to further strengthen the fuselage portion, a plurality of connection elements are arranged at the respective crossing points between stringers and annular formers, said connection elements connecting the annular formers, the stringers and the fuselage skin. The fuselage sections may be produced in the conventional manner using aluminium, using composite material or with what is known as a hybrid construction method. With regard to the hybrid construction method (composite construction: aluminium alloy materials/fibre-reinforced plastics material materials) specific components of the fuselage structure are formed using aluminium alloys and further components are formed using composite materials, such as carbon fibre-reinforced epoxy resins.

In order to install electrical lines or other types of lines, such as hydraulic lines, water and sewage lines, ventilation and exhaust air lines as well as air-conditioning lines, a visible plurality of holders is ordinarily fixed to the fuselage structure of the aircraft. For this purpose, at least one fixing hole is generally made in the fuselage structure for each holder to be fixed, in which hole the holder for guiding and fixing the line is fixed by means of a suitable fixing element, for example a rivet element a screw, an expansion plug or the like.

For various reasons making a plurality of fixing holes in the fuselage structure is undesirable. Each fixing hole statically weakens the fuselage structure and causes problems with corrosion in the region of the bearing surface of the hole, which are ordinarily prevented by means of expensive protective measures against corrosion, such as sealing the bearing surfaces of the holes with suitable materials. Furthermore, the bearing surface of each hole is a preferred starting point for fatigue cracks, the identification and correction of which over the entire service life of the aircraft entails greatly increased inspection and maintenance costs, inspections also having to be carried out at regular intervals which are strictly adhered to. Furthermore, the actual creation of each fixing hole is also complex, since the generally manual drilling devices are currently still positioned using large templates. The resulting hole chips should also be carefully removed from the fuselage structure by means of suction in order to prevent short-circuits and further problems with corrosion. Badly placed holes, for example in an annular former in the primary structure, also result, in some cases, in the entire annular former having to be replaced. Lastly, changing the installation of the lines at short notice, for example when customising passenger planes for a particular customer, can only be made at a high cost.

SUMMARY OF THE INVENTION

It is one of the objects of the invention to provide a holder for lines in aircraft which can be fixed with no holes and, to a large extent, without using tools at almost any location inside the fuselage structure.

Accordingly, a holder is provided for fixing components without using holes inside a fuselage structure of an aircraft, the fuselage structure being braced with a plurality of longitudinal strut elements and with a plurality of transverse strut elements, an angle bracket being arranged at each crossing point between a longitudinal strut element and a transverse strut element, wherein the holder comprises a lower part and an upper part which can be connected to the lower part, wherein the lower part is slidable on an angle bracket, wherein the lower part, when connected to the upper part, surrounds, at least in some regions and with a positive fit, a top region of a transverse strut element for positionally fixing the holder, and wherein the upper part and/or the lower part comprise at least one function element for fixing at least one component.

Since the holder comprises a lower part and an upper part which can be connected thereto, the lower part being slidable onto an angle bracket, and the lower part connected to the upper part surrounds, at least in some regions and with a positive fit, a top region of an annular former for positionally fixing the holder, the upper part and/or the lower part comprising at least one function element for fixing at least one component, in particular a line, the holder according to the invention may be fixed inside a grid defined by the crossing points or crossing regions between the longitudinal and transverse strut elements, in particular the annular formers and the stringers, independent of location and without holes at a plurality of locations inside the fuselage structure. The possibilities for positioning the holder are thus only limited by the grid (lattice spacings) specified by the former and stringer spacings, in the case of conventional aircraft fuselage structures a sufficiently high number of fixing points always being provided. The term "components" defines any components inside an aircraft which may be fixed by means of the holder inside the fuselage structure. A component which can be fixed by means of the holder may, for example be an insulating mat, a light source, an inner lining component, stairs, a technical device, a technical means or the like. However, the components may be any type of (substantially linear) line, in particular electrical lines, hydraulic lines, pneumatic lines or even air-conditioning lines as well as fresh water and sewage lines which are fixed to the fuselage structure by means of the holder configured according to the invention.

By using battens as embodiments of function elements, which can be connected to at least two of the holder elements according to the invention and on which a greater number of components or lines can be fixed, the possibility of installing lines at varying locations and thus the scope of application of the holder are increased as well as the capacity of the holder to carry lines. The holder according to the invention comprises a lower part and an upper part which can be connected thereto. The lower part and/or the upper part may be connected to at least one universal function element which actually fixes the components or the lines to be installed to the holder. In order to fix components, which are not actually lines, the function element is to be suitably configured with the specific application in mind and may be formed, for example, as a connection element of which the side faces form, for example, an interface between the holder and an inner lining panel to be attached to the fuselage structure or an insulating mat.

By means of a plurality of differently configured function elements, a plurality of different fixing problems when connecting a wide range of components can be solved with one and the same (basic) type of holder. Due to the modular and universal configuration of the holder, the number of parts forming said holder is still limited. The function element may alternatively also be configured as an integral component of the upper part and/or the lower part.

In order to fix the holder at any location in the fuselage structure, the lower part is first slid onto an angle bracket arranged at a crossing point between the annular former and the stringer. Subsequently, the upper part is fitted onto the lower part.

The holder is finally positionally fixed, for example by connecting the lower part and the upper part to a transverse line holder as a function element, the connection being achieved, for example, by means of what is known as an expansion clamp connection. When, for example, at least one arm arranged in the region of the hole is pressed into an undercut position in relation to a (lower) hole edge by inserting a pin into a hole, instead of an expansion clamp connection, any alternative locking, clamping, riveting, plug-in or screw elements may be used as connection elements. Furthermore, the upper part, the lower part and the transverse line holder may be glued or fused together. Alternatively, it is also possible to first establish a connection between the upper part and the lower part in order to arrange the holder in its final position in the fuselage structure, and subsequently to connect a function element to the holder using a further connection element. The connection between the upper part, the lower part and the transverse line holder is, in any case, configured in such a way that the possibility of unintentional disconnection is eliminated. Additional retaining means, such as retaining pins, retaining bands or the like are optionally provided for this purpose. If necessary, an insulating mat may also be fixed to the holder as a component to be fixed such as by means of a transverse line holder. Alternatively, specifically configured function elements may be used to connect insulating mats either instead of or in addition to the transverse line holder, for example a holder similar to a spoked wheel, having low surface pressure for positionally fixing insulating mats to the fuselage structure.

The holder is held in position against movements parallel to the y-axis (transverse to the longitudinal axis of the aircraft or the transverse axis of the aircraft) by the lower part which has been slid onto the angle bracket, whilst the combination of the upper part and the lower part cooperating with a top region of the profiled annular former (there being a positive fit, at least in some regions, between the top region of the annular former and the two parts of the holder) ensures that the holder is positioned securely parallel to the longitudinal axis of the aircraft and the vertical axis of the aircraft.

Since no particular number of fixing holes for installing lines is necessary in the fuselage structure, a large part of the total cost for installing lines in an aircraft, in particular with regard to positioning the fixing means, generally manually making the holes, subsequently removing chips by suction and sealing and lining the fixing holes is dispensed with. Furthermore, the holder according to the invention allows changes to be made at short notice at any time to the wiring of the aircraft and expensive corrosion-prevention and sealing measures in the region of the bearings of the holes to be dispensed with.

A further embodiment of the holder provides for the top region of the annular portion to be bent at least once, in particular so as to have a cross-section in the shape of an inverted U or an L-shaped cross-section.

Consequently, the holder fits particularly securely at the crossing point between the stringers and the annular former. In principle, the top region of the annular former may have a shape which is different from the cross-section in the shape of an inverted U. In order for the holder to fit securely, it is, however, crucial for the upper part and the lower part of the holder to have a contour which is shaped appropriately to the profile of the top region of the annular former in such a way that the holder surrounds, at least in some regions and with a positive fit, both the top region of the annular former and the angle brackets in an assembled state, forming a interference fit.

According to one particular embodiment, the function element is configured as a transverse line holder which fixes lines which extend substantially parallel to the transverse strut elements, in particular the annular formers.

Consequently, it is possible to fix in position electrical lines in particular which are to be installed so as to extend parallel to an annular former (transverse to the longitudinal axis of the aircraft) in the fuselage structure. In this case, the transverse line holder comprises at least one shell-shaped support surface, into which at least one line or bundle of cables is inserted, centred and, for example, may be fixed using a conventional cable connector. Each transverse line holder may comprise two segment-shaped curved support surfaces for centring and fixing the lines or bundle of cables. Alternatively, the support surface may be configured in such a way that it comprises, in the region of opposing longitudinal edges, a small holding arm, for example, which springs back after a line or bundle of lines to be fixed has been pushed in and, in this way, automatically fixes the line. In particular, this embodiment has the advantage that no additional elements, for example cable connectors, clips, ties or the like are needed to positionally fix the at least one line.

A further embodiment of the invention provides for the at least one function element to be a longitudinal line holder, on which at least one line extending parallel to a longitudinal strut element may be fixed. In this manner, the installation of lines extending parallel to the longitudinal strut elements (parallel to the longitudinal axis of the aircraft), in particular in the form of stringers, is facilitated by means of the holder. In turn, each longitudinal line holder may comprise at least one shell-shaped support surface for receiving at least one line or a bundle of cables. Each longitudinal line holder may comprise at least two support surfaces. The lines are positionally fixed on the support surfaces of the longitudinal line holder in a manner corresponding to the way in which the lines are fixed on the transverse line holders.

According to the provisions of a further embodiment, the lower part comprises a longitudinal slot and at least one holding element, it being possible to insert a holding element from underneath into the top region of the annular former, at least in some regions and with a positive fit.

The longitudinal slot splits the lower part into two arms connected by a horizontal web, the arm abutting the angle bracket on both sides and preventing the holder from being displaced transverse to the longitudinal axis of the aircraft. In this case, the width of the slot is selected in such a way that there is a slight interference fit when the lower part is slid or pushed onto the bracket angle, in order to eliminate any mechanical play or movement of the holder transverse to the longitudinal axis of the aircraft.

According to the provisions of a further embodiment, it is provided that the upper part comprises at least one guide recess delimited by at least two guide elements.

The guide recess has a substantially rectangular cross-section in such a way that a positive fit, at least in some regions, can be produced with the outer surfaces of the top region of the annular former. Due to the guide recess in the upper part being laterally delimited on both sides by at least two substantially cuboid guide elements, the upper part is initially prevented from being displaced parallel to the longitudinal axis of the aircraft (x-axis). Due to the cooperation of the upper part and the lower part, the top region of the annular former being received in the guide recess of the upper part and the holding element being received at the lower side in the top region of the annular former, the holder is also prevented from moving parallel to the vertical axis (z-axis) of the aircraft. Both the guide recess and the holding element may be dimensioned in such a way that a slight press fit or interference fit is produced by the top region of the annular former when the two holder parts are connected so as to avoid any mechanical play. As a result, the guide recess of the upper part and a (first) holding element of the lower part form, in the assembled state of the holder, a cavity having a cross-section which is configured so as to correspond to the cross-section shaped as an inverted U of the top region of the annular former and the holder is thus fixed in position relative to the longitudinal axis of the aircraft and the vertical axis of the aircraft.

A further embodiment of the holder provides for it to be possible to bring at least one guide element of the upper part into engagement with at least one holding recess of the lower part, at least in some regions and with a positive fit. Consequently, secure positioning of the upper part on the lower part and precise positioning of the parts relative to one another are ensured since further "toothing" or engagement is produced between the lower part and the upper part of the holder outside the top region of the annular former.

Furthermore, a holder arrangement may comprise at least two holders in accordance with claim 1, wherein the at least one function element is a transverse batten, which extends parallel to the at least one transverse strut element and which is connected via said at least two holders to the transverse strut element.

Since at least one function element is configured as a transverse batten which extends parallel to the at least one transverse strut element, in particular at least one annular former, and which is connected to at least two holders, a plurality of electrical lines (bundle of lines) which extend substantially parallel to the stringers (parallel to the longitudinal axis of the aircraft) may be fixed. In this case, the transverse batten supports a plurality of longitudinal line holders in particular for receiving the lines or bundle of cables extending in a longitudinal direction of the aircraft. Alternatively, the batten may also be provided with a plurality of transverse line holders which allow lines or bundles of cables extending transverse to the longitudinal axis of the aircraft to be received and fixed. The transverse batten can be fixed by at least two holders configured according to the invention and arranged at an end of the transverse batten. The two holders are fixed similarly to the way in which a single holder is fixed. The longitudinal line holder and the transverse line holder may also be integral components of the transverse batten. Alternatively, it is also possible to fix the longitudinal line holder and the transverse line holder to the transverse batten by means of any locking or clamping connections. For this purpose, the transverse batten may be provided with a suitable hole grid which enables the line holder to be fixed in a stepped manner in various locations.

Furthermore, a holder arrangement may comprise at least two holders as described above, wherein the at least one function element is a longitudinal batten, which extends parallel to the at least one longitudinal strut element and which is connected to said two holders.

Since the at least one function element is a longitudinal batten which extends parallel to the at least one longitudinal strut element and is connected to two holders, a plurality of lines may be guided and fixed in the region between two annular formers. The longitudinal batten which may be arranged parallel to the longitudinal axis of the aircraft is provided with at least two lateral legs which extend substantially parallel to and at a distance from one another and are connected to one another via at least two transverse webs. The longitudinal batten is e.g. fixed between two annular formers extending parallel to the longitudinal direction (x-axis) of the aircraft. The longitudinal batten is connected to the annular former by means of at least two of the holders described above, such as at both ends of the longitudinal batten. The at least two holders necessary for this are fixed to the annular formers in the same manner in which the individual (mono) holder is fixed inside the fuselage structure. A plurality of lines or bundles of cables which may extend parallel to the longitudinal strut elements and/or parallel to the transverse strut elements (i.e. parallel to the longitudinal axis of the aircraft and/or transverse to the longitudinal axis of the aircraft) may be fixed to the longitudinal batten. The lines are fixed to the longitudinal batten, in this case, e.g. using cable connectors, clips, ties or the like. Alternatively, plug-in clamp connections may be provided, additional fixing means for the lines or the bundle of cables thus being unnecessary.

The holders according to the invention which can be fixed at the crossing points of the fuselage structure of an aircraft at varying locations and, largely, without using tools, can be used, if necessary in combination with the transverse battens and the longitudinal battens, to install almost any complex arrangement of lines, in particular electrical cabling, with minimal assembly costs and, at the same time, with a high degree of variability. As a result, almost all problems which arise with regard to installing cables and lines in a modern aircraft are solved with a minimum number of (holder) components in the most simple manner.

BRIEF DESCRIPTION OF THE DRAWINGS

In the figures, the same reference numbers refer to identical or functionally identical components unless otherwise stated.

DETAILED DESCRIPTION OF THE INVENTION

Figure 1:
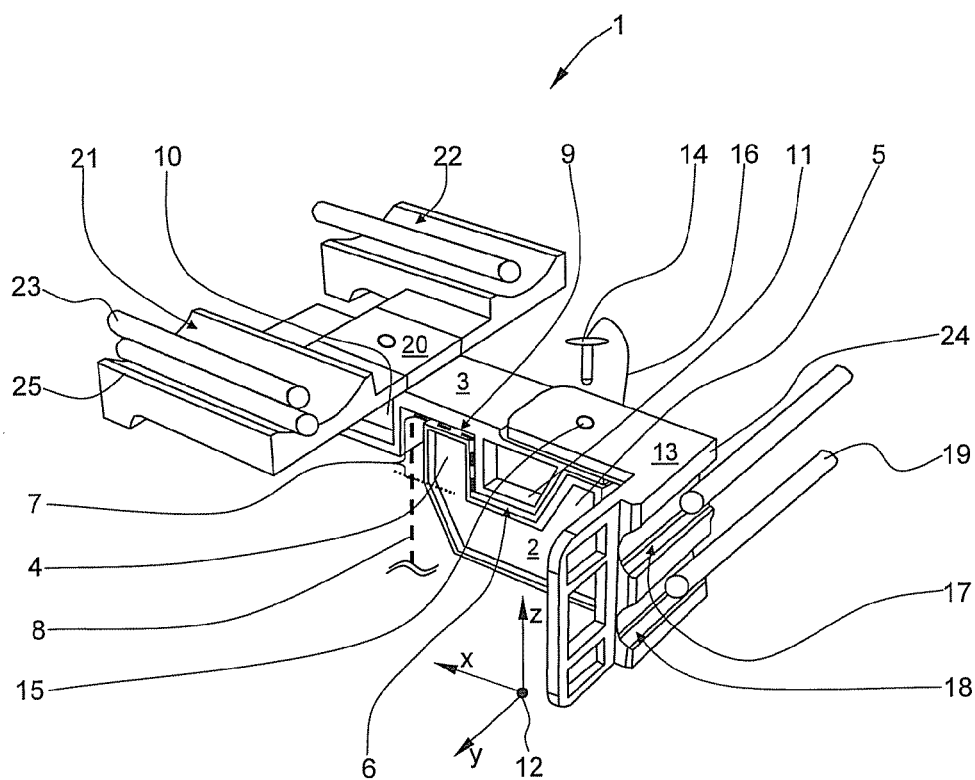
FIG. 1 is a perspective view of the holder comprising a longitudinal line holder and a transverse line holder, each for two lines or bundles of cables.

FIG. 1 is a perspective view of a holder according to the invention. A holder 1 comprises, inter alia, a lower part 2 and an upper part 3 which can be connected to the lower part 2. The lower part 2 comprises a first and a second substantially cuboid holding element 4, 5 which define a holding recess 6. The first holding element 4 can be inserted from below, at least in some regions and with a positive fit, into a top region 7 of an annular former 8. The annular former 8 acts as a transverse strut element in a fuselage structure (not shown) of an aircraft. Both the top region 7 and the annular former 8 are shown in FIG. 1 with a broken line. The top region 7 of the annular former 8 has a cross-section which is substantially in the shape of an inverted U. The upper part 3 is further provided with a first and a second downwardly pointing guide element 10, 11 which form a guide recess 9.

A coordinate system 12 defines the position of all the components in the space. A longitudinal axis of an aircraft (not shown) extends parallel to the x-axis (the longitudinal axis of the aircraft) of the coordinate system 12, the direction of flight corresponding to the orientation of the x-axis. The y-axis (the transverse axis of the aircraft or the axis extending transversely to the longitudinal axis of the aircraft) of the coordinate system 12 extends transversely to the direction of flight of the aircraft, whilst the z-axis (the vertical axis of the aircraft) of the coordinate system 12 represents a vertical axis which extends upwards in a perpendicular manner from the notional floor.

The first guide element 10 defines, in the configuration of the holder 1 according to the provisions of FIG. 1, in cooperation with the holding recess 6, a cavity which is not denoted with a reference numeral and in which the top region 7 of the annular former 8 rests, at least in some regions and with a positive fit. By means of this configuration, the holder 1 may no longer be displaced parallel to the x-axis and z-axis of the coordinate system 12 relative to the annular former 8. The positive fit described may be configured in such a way that there is a slight press fit or interference fit in order to eliminate any mechanical play. The annular former 8 or the transverse strut element extends substantially transverse to the longitudinal axis of the aircraft (x-axis), i.e. parallel to the y-axis.

A transverse line holder 13 is fixed via the rear side thereof to the holder 1. The transverse line holder 13 is fixed to the holder 1, for example by means of an expansion pin 14 which is inserted into a hole 15. Consequently, the lower part 2 and the upper part 3 of the holder 1 are simultaneously connected in such a way that the holder 1 is fixed in position on the annular former 8 against any displacement parallel to the x-axis and the z-axis.

In order to achieve a mechanically rigid hold between the lower part 2, the upper part 3 and the transverse line holder 13, at least one holding arm or clamping arm (not shown) is for example provided in the lower part 2, which supporting or clamping arm is pressed, by means of the expansion pin 14 being pushed in, into an undercut position relative to the hole 15, resulting in a combined press and friction fit which connects the lower part 2, the upper part 3 and the transverse line holder 13. The expansion pin 14 is captively connected to the upper part 3 by means of a retaining band 16 which is an integral component of the upper part 3.

The transverse line holder 13, as one of the many possible function elements which may be connected to the holder 1, is provided in the embodiment shown in FIG. 1 with two support surfaces 17, 18 for lines, electrical lines or bundles of cables or the like which are to be fixed so as to extend parallel to the y-axis. Only one line 19 is provided with a reference numeral, said line being representative of all the other lines. Furthermore, a longitudinal line holder 20, as a further modular, optionally connectable function element, is arranged on the upper part 3 and is provided with two support surfaces 21, 22 for receiving and positionally fixing lines, electrical lines or bundles of cables or the like which extend parallel to the x-axis. One line 23 on the longitudinal line holder 20 is provided with a reference numeral, said line being representative of the other lines. The lines 19, 23 may be fixed in their final positions on the support surfaces 17, 18 and 21, 22, for example by cable connectors, clamping straps or the like (not shown). Instead of the two respective support surfaces 17, 18 and 21, 22, both the transverse line holder 13 and the longitudinal line holder 20 may each comprise a different number of support surfaces.

Alternatively, in the region of longitudinal edges (of which only two longitudinal edges 24, 25 on the transverse and longitudinal line holders 13, 20 are provided with a reference numeral and are representative for the other longitudinal edges) of the approximately segment-shaped curved support surfaces 17, 18, 21, 22, holding arms or spring arms may be arranged which are initially pressed back when a line 19, 23 is inserted. When the lines 19, 23 to be fixed have achieved their final position on the respective support surfaces 17, 18, 21, 22, i.e. are resting thereon, the holding arms automatically spring back into their starting position in order to secure the lines 19, 23.

The longitudinal line holder 20 may, in a corresponding manner to the transverse line holder 13, be fixed to the upper part 3 of the holder 1 by means of an expansion pin. Alternatively, it is also possible for the longitudinal line holder 20 to also be configured so as to be integral, i.e. in one-piece, with the upper part 3.

Figure 2:
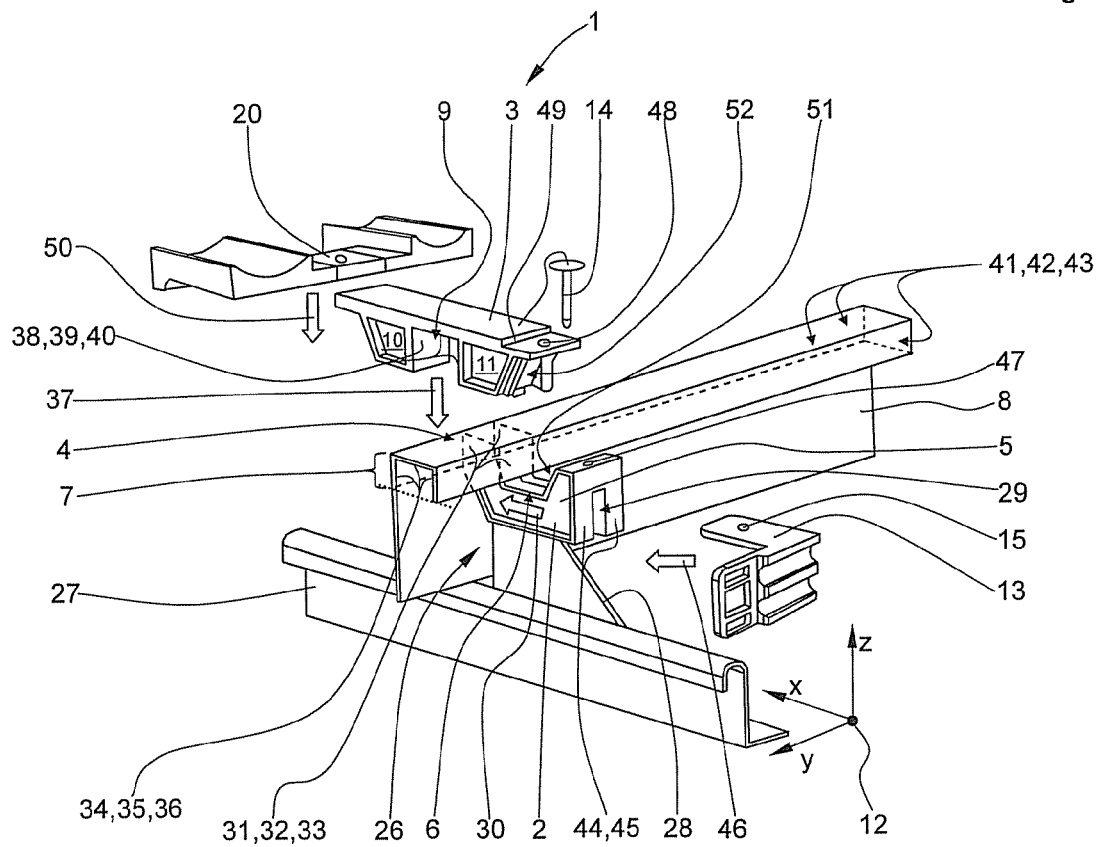
FIG. 2 is an exploded perspective view of the individual components of the holder.

FIG. 2 is a schematic exploded perspective view of the individual components of the holder according to the provisions of FIG. 1. It can be seen from FIG. 2 that the holder 1 is arranged at a crossing point 26 between the annular former 8 and a stringer 27 of the fuselage structure (not shown) of the aircraft. The stringer 27 and all other stringers (not shown) of the fuselage structure extend approximately parallel to the x-axis of the coordinate system 12, a distance of between 10 cm and 70 cm existing between each stringer. The annular former 8 and all other annular formers (not shown) of the fuselage structure extend parallel to the y-axis of the coordinate system 12, a distance of up to 70 cm existing between each annular former.

The annular former 8 is connected by means of an angle bracket 28 to the stringer 27 and the fuselage skin (also not shown) extending therebelow. The holder 1 comprises, inter alia, the lower part 2, the upper part 3, the longitudinal line holder 20 and the transverse line holder 13 as function elements. The lines fixed to the transverse line holder 13 and the longitudinal line holder 20 are not shown for reasons of clarity.

The lower part 2 comprises a longitudinal slot 29 in such a way that the lower part 2 can be slid onto the angle bracket 28 in the direction of the arrow 30. Consequently, all three contact surfaces 31 to 33 (reference numerals given in clockwise direction) of the substantially cuboid holding element 4 are brought into contact with the corresponding three inner surfaces 34 to 36 in the top region 7 of the annular former 8. Both the contact surfaces 31 to 33 and the inner surfaces 34 to 36 meet one another at an angle of approximately 90°. Subsequently, the upper part 3 is lowered or fitted onto the top region 7 of the annular former 8 in the direction of the arrow 37. In this case, a total of three guide surfaces 38 to 40 of the guide recess 9 of the upper part 3 are also brought into contact, preferably across the entire surface thereof, with three outer surfaces 41 to 43 of the top region 7 of the annular former 8, a complete positive fit is ideally achieved between all surfaces. Both the guide surfaces 38 to 40 and the outer surfaces 41 to 43 respectively meet one another at an angle of 90°. By means of a longitudinal slot 29 in the lower part 2, two arms 44, 45 are formed which abut the angle bracket 28 with a slight press fit on both sides.

Subsequently, the transverse line holder 13 is positioned as a function element on the upper part 3 in the direction of the arrow 46 and is fixed by inserting the expansion pin 14 as a connection element into the hole 15 in the transverse line holder 13 and the holes 47, 48 in the lower and upper parts 2, 3. In order to ensure precise positioning and security against rotation, the upper part 3 comprises a small recess 49 as a contact surface for the transverse line holder 13. The expansion pin 14 consequently cooperates with at least one expansion arm, e.g. arranged on the lower part 2, in the manner previously disclosed in the description of FIG. 1.

The holder 1 is secured against any displacement parallel to the y-axis by means of the longitudinal slot 29 in conjunction with the angle bracket 28. Due to the positive fit, at least in some regions, between the lower part 2, the upper part 3 and the top region 7 of the annular former 8, the position of the holder 1 is also spatially secured against any displacement parallel to the x-axis and the z-axis. The holder 1 is consequently completely secured in position at the crossing point 26 by only one connection element in the form of the expansion pin 14, no hole having to be made in the fuselage structure of the aircraft, said structure comprising annular formers, stringers, angle brackets and the fuselage skin. The holder 1 may thus be optionally fixed to any desired point of the grid inside the fuselage structure provided by the annular formers and stringers. If the distance between the stringers is, for example, 20 cm and the annular formers are fixed at a distance of 70 cm from one another, the crossing points between the annular formers and the stringers are separated over the fuselage structure in a grid measuring 20 cm×70 cm and the holder 1 may be fixed at any of these crossing points.

If the shape of the cross-section of the top region 7 of the annular former 8 deviates from that in the illustrated embodiment, a corresponding different configuration of the lower and upper parts 2, 3 of the holder 1 is required in such a way that a positive fit, at least in some regions, can be achieved between the upper-side surface geometry of the lower part 2 and the lower-side surface geometry of the upper part 3 configured so as to be complementary thereto and the top region 7, a sufficiently large cavity for receiving the top region 7 with a slight interference fit being provided between the lower and upper parts 2, 3 of the holder 1.

In order to complete the assembly of the holder 1 at the crossing point 26, the longitudinal line holder 20 is fitted and fixed, as a further optional function element, on the upper part 3 in the direction of the white arrow 50. The longitudinal line holder 20 may be fixed to the upper part 3 similarly to the way in which the transverse line holder 13 is fixed by means of an expansion pin (not shown). Alternatively, any other type of locking and/or clamping connections are possible between the longitudinal line holder 20 and the upper part 3. Furthermore, the longitudinal line holder 20 may also be an integral component of the upper part 3, the application flexibility of the holder 1, however, being reduced.

The lower part 2 of the holder 1 comprises a centring surface 51 which is marginally tilted or inclined with respect to the z-axis, whilst the upper part 3 comprises a correspondingly inclined or tilted centring surface 52. When the lower part 2 and the upper part 3 are connected, they are displaced horizontally against one another (parallel to the x-axis) in the direction of the arrow 30 due to the centring surfaces 51, 52 sliding on top of one another, a rigid press fit of the holder 1 on the top region 7 of the annular former 8 being ensured.

This displacement, inter alia, rigidly presses the contact surface 33 of the first holding element 4, the inner surface 34 of the top region 7 of the annular former 8 as well as the inner surface 36 of the annular former 8 and the guide surface 40 inside the guide recess 9 in the upper part 3 together. Small longitudinal ribs and corresponding grooves may, for example, also be provided on the centring surfaces 51, 52 so as to enable the upper part 3 to be precisely oriented and guided on the lower part 2 when the centring surfaces 51, 52 slide over one another.

Due to the modular basic construction of the (basic) holder 1 in the form of the transverse line holder 13 and the optional longitudinal line holder 20 as function elements, a high degree of flexibility of application is achieved, since the exemplary line holder can be easily exchanged for other function elements for guiding lines or fixing line systems without the number of various components necessary for this being considerably increased.

Additional components of the holder 1 may be formed with a thermoplastic and/or thermosetting plastics material which preferably comprises fibre reinforcement.

Continuing the description, reference is also made to FIG. 3 to 6, which show the process of installing the holder which can be fixed using no holes and no tools. The coordinate system 12 illustrates the spatial position of the components.

Figure 3:
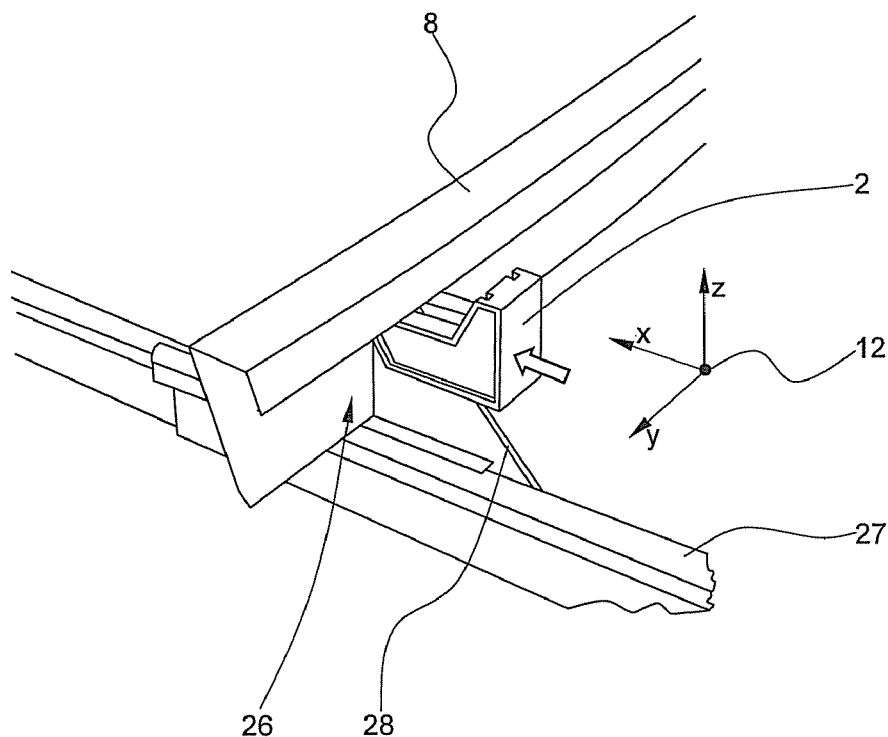
FIG. 3 to 6 show the individual components of the holder at a crossing point between a stringer and an annular former.

Firstly, as shown in FIG. 3, the lower part 2 is slid onto the angle bracket 28 in the direction of the white arrow, thus forming a press fit. The angle bracket 28 connects the annular former 8 to the stringer 7 at a crossing point 26 on the one hand and is also connected to a fuselage skin (not shown) of the fuselage structure arranged therebelow on the other.

Figure 4:
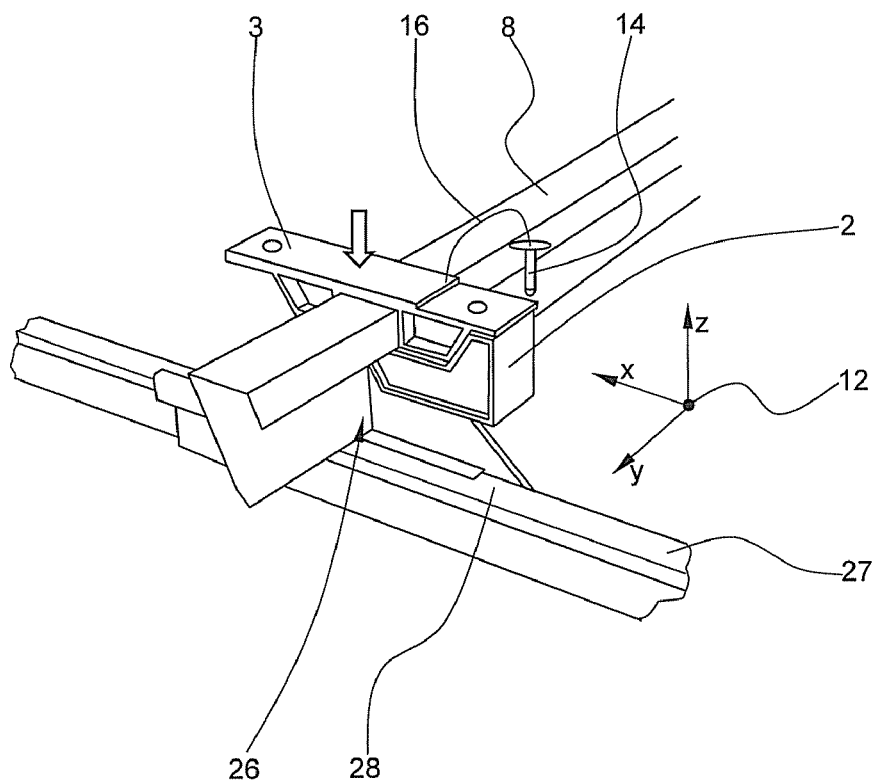

In a further installation step, the upper part 3 is fitted to and positioned on the lower part 2 in the direction of the white arrow, as can be seen in FIG. 4. The expansion pin 14 is captively held to the upper part 3 by means of the retaining band 16.

Figure 5:
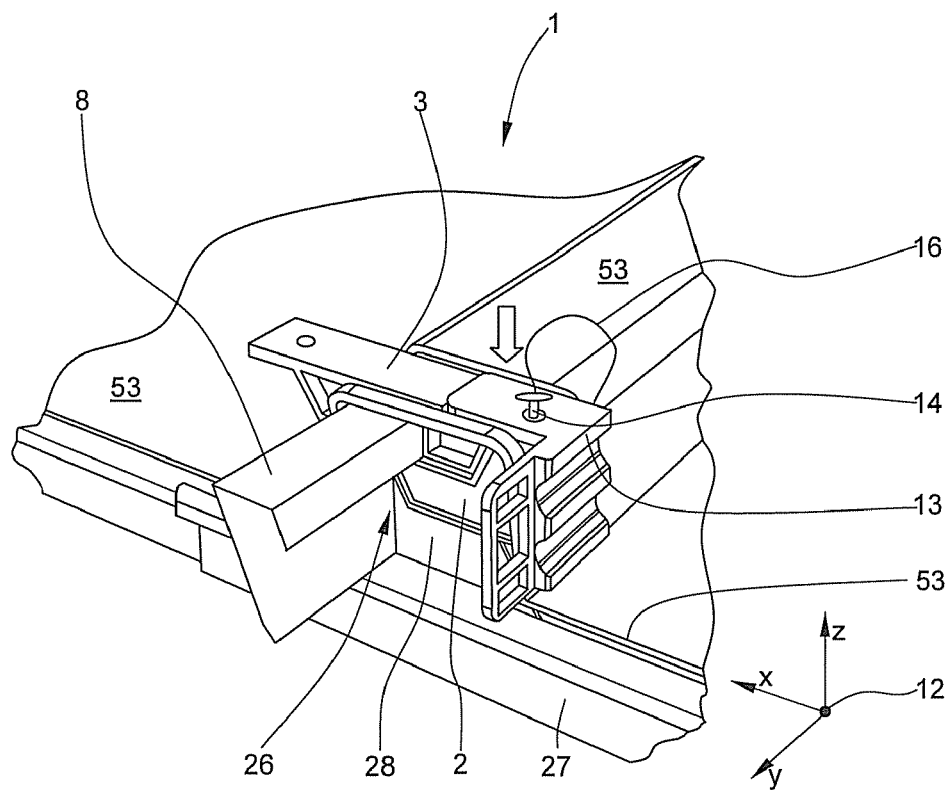

Before the transverse line holder 13 can be connected to the upper part 3, as can be seen in FIG. 5, an insulating mat 53 having a suitable thickness for thermally insulating the inside of the fuselage structure is, if necessary, laid over the annular former 8, the stringer 27 and the fuselage skin extending therebelow. The insulating mat 3 is fixed in position by being clamped beneath the transverse line holder 13 before said holder is connected to the upper part 3 or the lower part 2 of the holder 1. In the view shown in FIG. 5, the expansion pin 14 is already largely inserted into the transverse line holder 13, the lower part 2 and the upper part 3 of the holder 1 in the direction of the white arrow.

Figure 6:
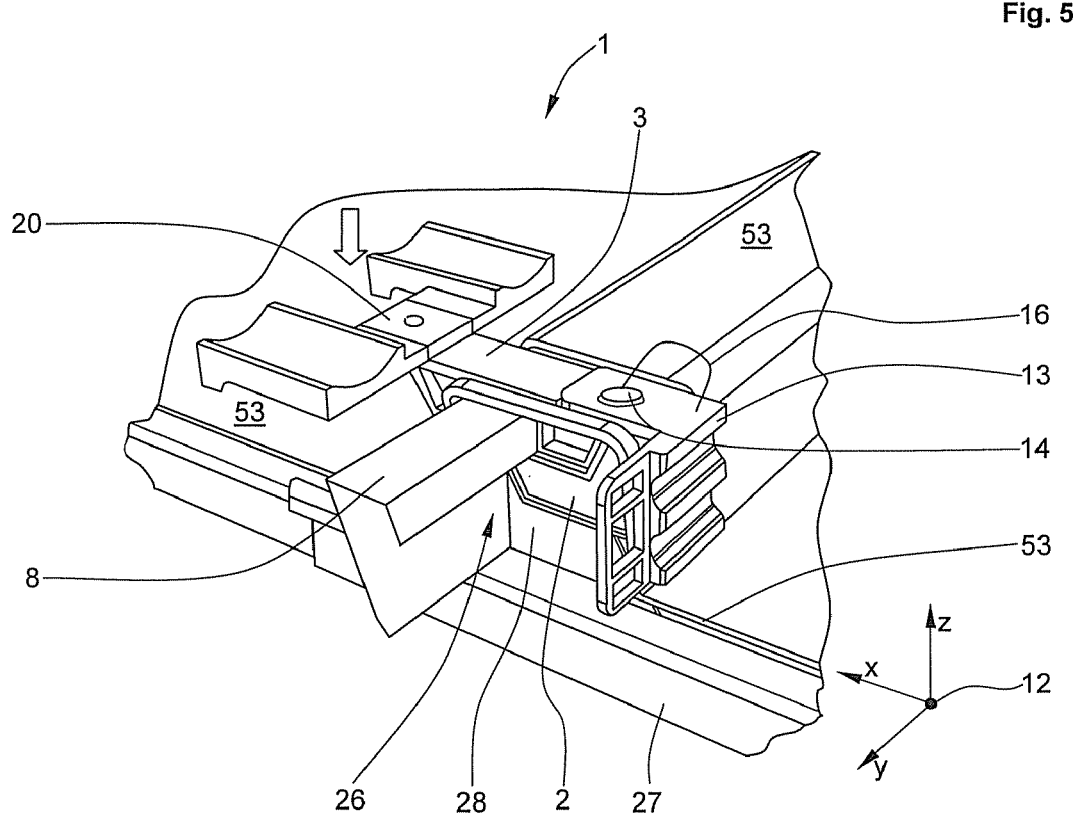

In a further installation step, as shown in FIG. 6, an optional longitudinal line holder 20 may be arranged on the upper part 3 if necessary. The longitudinal line holder 20 may be fixed similarly to the way in which the transverse line holder 13 is fixed by means of an expansion pin (not shown). Alternatively, a locking or clamping connection to the upper part 3 is also possible in such a way that the longitudinal line holder 20 can be connected to the upper part 3, simply by being fixed or clipped thereon, and can also optionally be removed again. Furthermore, the longitudinal line holder 20 may be configured so as to be in one piece with the upper part 3 of the holder 1.

Figure 7:
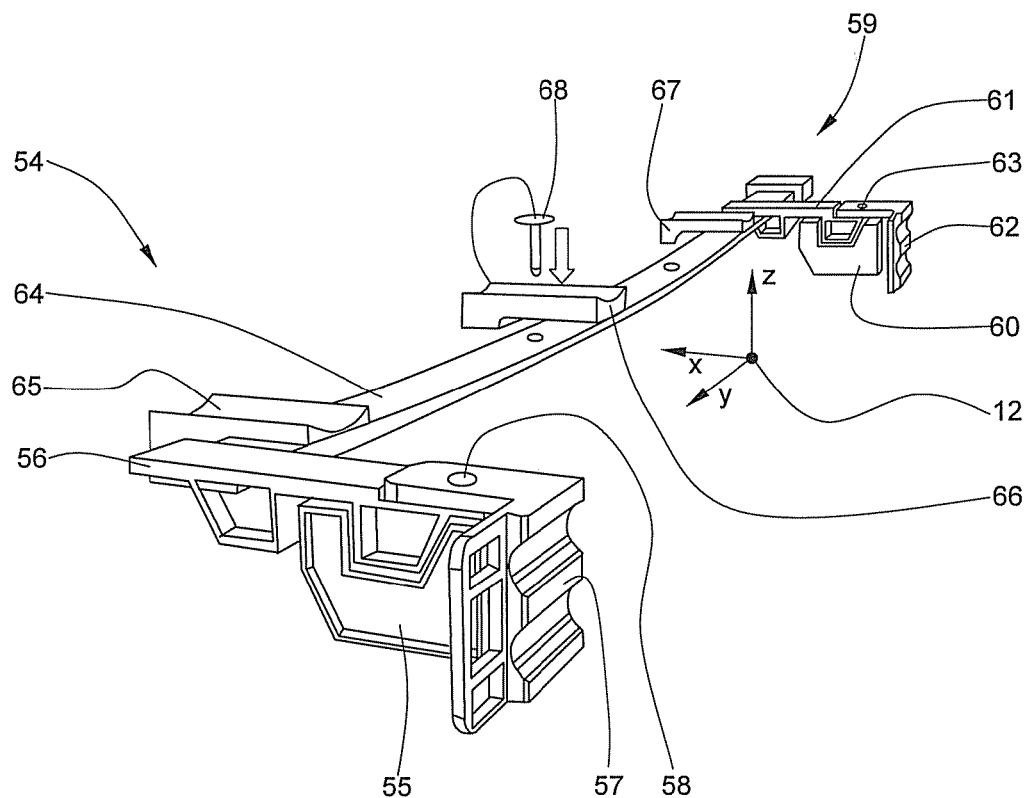
FIG. 7 shows a transverse batten fixed to two holders and having three longitudinal line holders, each for a line or one bundle of cables.

FIG. 7 shows a transverse batten fixed to two holders, said batten having three longitudinal line holders for a respective line or bundle of cables as a further function element which can be used in conjunction with the holder according to the invention.

A holder 54 in turn comprises a lower part 55, an upper part 56 and a transverse line holder 57 which are held together by means of an expansion pin 58 and are fixed to an annular former (not shown). The position of all components is shown by the coordinate system 12. A second holder 59 also comprises a lower part 60, and upper part 61 and a transverse line holder 62 which are connected to one another by an expansion pin 63 and are fixed to an annular former (not shown) of the fuselage structure of an aircraft. The transverse line holders 57, 62 each comprise two support surfaces which are curved in a concave manner and are not provided with reference numerals for fixing lines, bundles of cables or the like, which may extend substantially parallel to the annular former (not shown), i.e. parallel to the y-axis of the coordinate system.

In contrast to the above-mentioned variant of the holder, the upper parts 56, 61 are connected by a transverse batten 64 as a further function element. The transverse batten 64 extends parallel to the annular former (not shown) in the fuselage structure of the aircraft, the curvature of the transverse batten 64 substantially matching the in situ curvature of the fuselage structure. In the embodiment shown, three longitudinal line holders 65 to 67 are fixed to the transverse batten 64 by expansion pins, of which only one expansion pin 68 is shown and is representative of the other expansion pins. In order to enable the longitudinal line holders 65 to 67 to be fixed at varying locations, the transverse batten 64 may be provided with a plurality of holes arranged in a suitable hole grid. In order to enable fixing by means of the expansion pins, the longitudinal line holders 65 to 67 each comprise a through-hole (not shown) (parallel to the z-axis). At least one expansion arm is arranged on the lower side of the longitudinal line holder 65 to 67 in the edge region of the holes. In order to fix the longitudinal line holders 65 to 67, the at least one expansion arm of the longitudinal line holder 65 to 67 concerned is inserted into the hole provided in the transverse batten 64 and, subsequently, the expansion pin is pressed in from above in the direction of the white arrow into the hole of the longitudinal line holders 65 to 67 concerned, the at least one expansion arm being pressed outwards by the expansion pin and an undercut, at least in some regions, being produced with a lower side (not denoted with a reference numeral) of the transverse batten 64 in the region of a hole edge. Alternatively, the longitudinal line holders 65 to 67 and the transverse batten 64 may be configured in one piece as an integral component.

Figure 8:
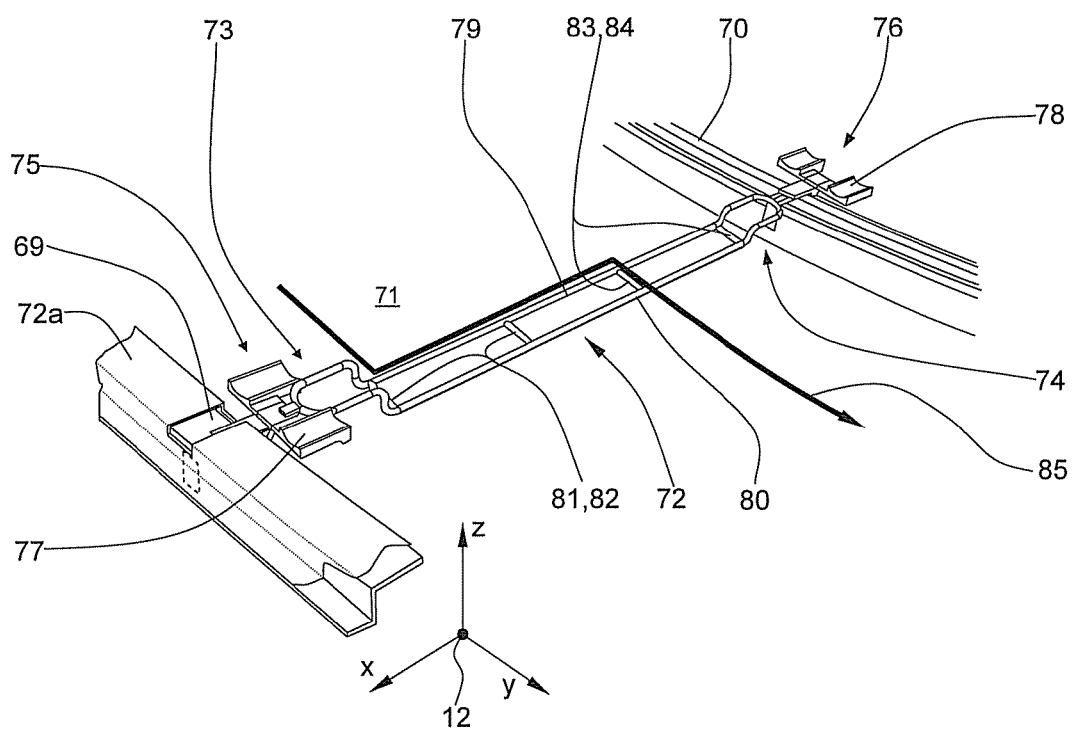
FIG. 8 shows a longitudinal batten fixed to two holders.

In FIG. 8, each of the longitudinal line holders 65 to 67 comprises a support surface, slightly curved in a concave manner, for at least one line or a bundle of cables. The lines may be fixed to the longitudinal line holders 65 to 67, for example by means of cable connectors, clips, ties, cords or the like. Alternatively, at least one holding arm configured so as to be resilient may be arranged, for example, at each longitudinal edge of each longitudinal line holder 65 to 67, which holding arm pivots back when a line is pressed into position and subsequently automatically springs back when the line to be fixed has reached the support surface, curved in a concave manner, of the longitudinal holders 65 to 67 so as to centre and fix the line in its position. The three longitudinal line holders 65 to 57 may, in contrast to the illustration shown in FIG. 7, also each comprise, for example, two or more support surfaces, curved in a concave manner, for at least one line or bundle of cables.

With regard to the further details for configuring the longitudinal line holders, reference is made to the embodiments regarding the construction of the longitudinal line holders mentioned within the above description of FIGS. 1 and 2.

Due to the holders 54, 59 connected by means of the transverse batten 64 and comprising the three longitudinal line holders 65 to 67 arranged thereon in an exemplary manner, a greater number of lines can be fixed parallel to the stringers not shown in FIG. 7, i.e. extending parallel to the x-axis, without a correspondingly high number of holders being necessary. The transverse batten 64 may be connected via the expansion pins to the upper parts 56, 61. Alternatively, any type of screw, rivet, locking, clamping, adhesive bonding, welding or plug-in connection is possible between the transverse batten 64 and the upper parts 56, 61. In contrast thereto, the transverse batten 64 may also be configured so as to be integral with the two upper parts 56, 51. Furthermore, the transverse batten 64 may, if necessary, have a greater longitudinal extension. In this case, it may be necessary for the transverse batten 64 to be supported on more than two holders 54, 59. Consequently, a greater number of longitudinal line holders 65 to 67 may be fixed to the transverse batten 64 in such a way that a greater number of lines may be fixed inside the fuselage structure parallel to the x-axis without using any holes.

The transverse batten 64 can be made of the same material as the holders 54, 59. Fibre-reinforced thermoplastic or thermosetting plastics materials may be used to produce the transverse batten 64.

FIG. 8 shows a longitudinal batten as a further function element which can be fixed in a fuselage structure of an aircraft by means of at least two holders according to the invention.

A longitudinal batten 72 extends as a further function element between two annular formers 69, 70 of a fuselage structure 71, the fuselage structure 71 being fitted with an insulating mat 71a for thermal insulation. The substantially straight longitudinal batten 72 extends parallel to the x-axis, i.e. parallel to the stringers (not shown) or longitudinal strut elements of the fuselage structure 71. Each of the two approximately semi-circular ends 73, 74 of the longitudinal batten 72 is connected to a holder 75, 76 configured according to the invention. The holders 75, 76 are each clamped to the annular formers 69, 70 in the manner described above (see, in particular, FIG. 1 to 6), the continuous insulating mat 72a or damping mat for example having, in particular in the region of the holders 75, 76, simply a reduced material thickness, so as to facilitate the clamping of the insulating mat 72a beneath the two holders 75, 76. In FIG. 8, the insulating mat 72a is shown in a cut-away view in the region of the holders 75, 76 for reasons of clarity. The two holders 75, 76 comprise longitudinal line holders 77, 78 for installing lines or bundles of cables which extend parallel to the x-axis of the coordinate system 12. The end 73 of the longitudinal batten 72 is connected to the longitudinal line holder 77 in the region thereof, whilst the end 74 of the longitudinal batten 72 is fixed to a side of the holder 76 (on which a transverse line holder which is not shown may optionally be fitted) facing away from the longitudinal line holder 78. The longitudinal batten 72 is mechanically connected to the two holders 75, 76 arranged parallel on the annular formers 69, 70 by means of locking, clamping, plug-in, screw elements or the like (not shown). The one overall longitudinal batten 72 shaped in an approximately linear manner has, in the embodiment shown in FIG. 8 two lateral legs 79, 80 which extend substantially parallel to one another and are connected to four transverse webs 81 to 84 extending perpendicular to the lateral legs 79, 80. The longitudinal batten 72 can be produced in one piece from the same plastics material which is used for the holder. The lines or bundles of cables to be installed are fixed to the longitudinal batten 72 by means of cable connectors or the like (not shown). It is possible, due to the longitudinal batten 72, to guide and fix a line 85 or bundle of cables 85 (cable lines, cable paths) in the region between two annular formers 69, 70 extending parallel to the y-axis and/or also parallel to the x-axis.

Due to a combination of the holders according to the invention comprising longitudinal line holders and transverse line holders as well as longitudinal battens and transverse battens as function element arranged thereupon, any complex line installation or cabling can be installed and fixed inside a fuselage structure of an aircraft, largely without using any holes and tools. Furthermore, the holders, which can be fixed using no holes and tools, enable any changes to the cabling to be made quickly and in a flexible manner at any installation stage so as to be able, for example, to fulfil any client-specific requirements.

What is claimed is:

1. An aircraft fuselage structure, comprising:
    a stringer;
    a former;
    an angle bracket arranged at a crossing point between the stringer and the former; and
    a holder comprising a lower part and an upper part connected to the lower part;
    wherein the lower part has a slot engaging the angle bracket and a holding element inserted into a top region of the former; and
    wherein the upper part or the lower part comprises at least one function element fixing at least one component.

2. The fuselage structure according to claim 1, wherein the top region of the former is bent at least once and has a cross-section which is substantially shaped as at least one of an inverted U-shaped cross-section or an L-shaped cross-section.

3. The fuselage structure according to claim 1, wherein the at least one function element is a line holder fixing at least one line extending substantially in a transverse direction with respect to the stringer.

4. The fuselage structure according to claim 1, wherein the at least one function element comprises at least one line holder fixing at least one line extending substantially parallel to the stringer.

5. The fuselage structure according to claim 1, wherein the upper part comprises at least one guide recess.

6. The fuselage structure according to claim 1, wherein at least one guide element of the upper part t is in engagement with at least one holding recess of the lower part.

7. The fuselage structure according to claim 3, wherein the upper part is connected to the lower part and to the line holder by a connection element.

8. The fuselage structure according to claim 7, wherein the connection element comprises an expansion pin.

9. The fuselage structure according to claim 3, wherein the transverse line holder is adapted to fix an insulating mat.

10. The fuselage structure according to claim 4, wherein the at least one line holder is connected to the upper part in a locking manner or by means of a connection element.

11. The fuselage structure according to claim 1, wherein said component comprises a line.

12. The fuselage structure according to claim 11, wherein said line comprises an electrical line.

13. The aircraft fuselage structure according to claim 1, comprising at least two holders, wherein the at least one function element is a transverse batten, which extends parallel to the former and which is connected via said at least two holders to the former.

14. The aircraft fuselage structure according to claim 13, wherein the transverse batten comprises at least one longitudinal line holder for fixing at least one line.

15. The aircraft fuselage structure according to claim 13, wherein the transverse batten is provided with a hole grid for locally fixing at least one longitudinal line holder in a flexible manner.

16. The aircraft fuselage structure according to claim 1, comprising at least two holders, wherein the at least one function element is a longitudinal batten, which extends parallel to the stringer and which is connected to said two holders.

17. The aircraft fuselage structure according to claim 16, wherein the longitudinal batten comprises at least two lateral legs which are connected to one another by at least two transverse webs, the longitudinal batten being adapted to fix at least one line.

* * * * *